United States Patent [19]

Spisz

[11] Patent Number: 4,551,118

[45] Date of Patent: Nov. 5, 1985

[54] COUPLED DRIVE SHAFT

[75] Inventor: Albert S. Spisz, Livonia, Mich.

[73] Assignee: Burroughs Corporation, Detroit, Mich.

[21] Appl. No.: 586,281

[22] Filed: Mar. 5, 1984

[51] Int. Cl.[4] .............................................. F16B 2/06
[52] U.S. Cl. ................................... 464/182; 403/298; 403/341; 403/354
[58] Field of Search ................... 464/81, 84, 182, 147; 403/291, 292, 354, 341, 298, 313, 376

[56] References Cited

U.S. PATENT DOCUMENTS

| 34,769 | 3/1862 | Northrup | 403/310 |
|---|---|---|---|
| 92,319 | 7/1869 | Kennedy | 403/287 |
| 99,508 | 2/1878 | Williams | 24/573 |
| 113,728 | 4/1871 | Blessing | 403/293 |
| 212,547 | 2/1879 | Forbes | 403/310 |
| 261,134 | 7/1882 | Chapman | 403/298 |
| 319,240 | 6/1885 | Guss | 403/298 |
| 333,376 | 12/1885 | Yocom | 403/309 |
| 501,918 | 7/1893 | Caldwell | 403/298 |
| 658,389 | 9/1900 | Morgan | 403/298 |
| 709,400 | 9/1902 | Fitzpatrick | 403/341 |
| 799,106 | 9/1905 | Stevens | 403/341 |
| 804,023 | 11/1905 | Millhizer | 403/298 |
| 867,312 | 10/1907 | Shutz | 403/341 |
| 889,786 | 6/1908 | Keiner | 339/75 R |
| 1,073,690 | 9/1913 | Kerr | 464/154 |
| 1,164,801 | 12/1915 | Frazier | 15/143 R |
| 1,379,980 | 5/1921 | Harkness | 403/341 |
| 1,975,244 | 10/1934 | Wiseman | 403/341 X |
| 2,211,164 | 8/1940 | Rippenbein | 403/341 |
| 2,563,166 | 7/1947 | Gardner | 403/9 |
| 2,937,042 | 5/1960 | Wilder, Jr. | 403/354 |
| 3,499,299 | 3/1969 | Hector | 464/81 |
| 3,533,248 | 10/1970 | Freund | 464/147 |
| 3,874,133 | 4/1975 | Silvius | 52/285 |
| 4,382,709 | 5/1983 | Brown | 464/147 X |

FOREIGN PATENT DOCUMENTS

| 142687 | 10/1902 | Fed. Rep. of Germany | 403/354 |
|---|---|---|---|
| 192625 | 11/1982 | Japan | 464/147 |

Primary Examiner—Stephen Marcus
Assistant Examiner—Leo J. Peters
Attorney, Agent, or Firm—Mark T. Starr; Kevin R. Peterson

[57] ABSTRACT

A flexible coupling is disclosed for joining together shaft sections to form one continuous shaft which may be rotatably driven by a drive means provided at one end of the continuous shaft.

23 Claims, 5 Drawing Figures

COUPLED DRIVE SHAFT

BACKGROUND OF THE INVENTION

The present invention relates in general to drive shafts which are rotatably driven at one extreme in order to impart rotation to multiple members which are attached to the shaft. More particularly, the present invention relates to a coupling which is utilized to join together short shaft sections in order to form one long continuous shaft. Still more particularly, the present invention relates to a flexible coupling which is utilized to join together short shaft sections in order to form a continuous flexible shaft.

In many document sorting systems an auger drive assembly is utilized to drive individual stacker pocket augers positioned along the length of the drive assembly. Typically, such a drive assembly is composed of a long drive shaft on which pocket augers are mounted, the drive shaft being supported by multiple pillow blocks with a drive attached at one end of the drive shaft. The auger drive assembly is typically enclosed by stacker pocket assemblies and replacement of any component of the auger shaft necessitates removal of most, if not all, of the stacker pocket hardware. As a result, the cost of replacing a broken or damaged auger or shaft is quite high.

In the prior art, flexible couplings have been proposed to join together shaft sections. All known prior art couplings have a relatively large outside diameter in comparison with the shaft size and generally require the shaft sections to be longitudinally repositioned in order to attach a coupling to interconnect the shaft sections. Although the prior art couplings may reduce service time to some extent, the requirement of repositioning the shaft sections in order to attach the couplings still requires a significant amount of service time.

It is a general object of the present invention to overcome the shortcomings of the prior art and thereby reduce field service time by providing individual but continuous coupling driven shafts which together form an auger drive assembly.

It is a further object of the present invention to provide a coupling having an outer diameter which is approximately the same size as the diameter of the shaft sections coupled together.

It is a further object of the present invention to provide a drive shaft formed by coupling together short drive shaft sections wherein the shaft sections need not be longitudinally repositioned in order to attach a coupling between the shaft sections.

It is still a further object of the present invention to provide a flexible coupling for joining together rigid shaft sections to produce a continuous, flexible shaft which may be directed around abutments.

It is an additional object of the present invention to provide a coupling for joining together shaft sections wherein a rotational force applied to one shaft section will be transferred to each coupled shaft section.

It is yet another object of the present invention to provide a drive shaft formed by short segmented coupling driven sections rather than a long continuous shaft.

It is still another object of the present invention to provide a flexible coupling which joins together short shaft sections to form a long flexible shaft.

It is yet another object of the present invention to provide a segmented, coupled shaft wherein segments of the shaft or components mounted thereon may be easily replaced in an environment where there is limited access to the shaft.

These and other objects, features and advantages of the present invention will become more apparant from the following detailed description of the preferred embodiment when read in conjunction with the drawings.

SUMMARY OF THE INVENTION

According to the invention, a coupling is provided for joining together shaft sections in order to form one continuous shaft which may be rotatably driven by a drive means provided at one end of the continuous shaft.

In accordance with the preferred embodiment of the invention, at least one end of each shaft section is provided with a pair of slots at the end of the shaft section which cut across the diameter of the shaft section. The slots are positioned perpendicular to each other and cross each other at the center of the shaft section's longitudinal axis. In order to join together the two shaft sections, the two shaft ends are first aligned with each other so that the slots in the ends of the shaft sections are aligned parallel with each other. Next, a planar bridging member, having a thickness which is less than or equal to the width of the slots, is slid between one of the two slots in the end of each shaft section. The bridging member includes a groove cut completely through its planar surface. The groove extends longitudinally along the center of the planar surface of the bridging member and terminates before reaching the longitudinal ends of the bridging member. A first leaf member is then inserted into one side of the second slot in the ends of the two shaft sections. The first leaf member, which is planar and has a thickness which is less than or equal to the width of the slot, includes a protrusion which slides into the groove in the bridging member as the first leaf is slid into the second slot in the ends of the two shaft sections. The length of the protrusion is equal to or less than half of the length of the groove in the bridging member. A second leaf member is then inserted into the second slot in the ends of the two shaft sections at the side opposite that at which the first leaf member was inserted. The second leaf member also includes a protrusion which slides into the groove in the bridging member, the second leaf protrusion being longitudinally offset from that of the first leaf member's protrusion so that the second leaf member's protrusion slides into the portion of the groove unoccupied by the first leaf member's protrusion.

A pair of spring clips, one positioned around each shaft section and previously positioned away from the end of each shaft section, are next repositioned over the slots at the end of each shaft section. The spring clips serve to prevent the leaf members from falling out of the slots in the shaft sections thereby locking the coupling components in place. As a result, the shaft, sections are joined together so that the rotation of one shaft section will be transferred to the second shaft section so that they are rotated in unison.

Flexible couplings may be provided at both ends of each shaft section to thereby interconnect a plurality of shaft sections. In order to remove a shaft section, it is only necessary to remove the coupling provided at each end of the shaft section. This may be easily accomplished by repositioning the spring clips away from the ends of the shaft sections, removing the first and second leaf members, and finally removing the bridging members. With the couplings removed from each end of the shaft section, the shaft section may be removed from the continuous shaft without the need to reposition or remove adjacent shaft sections.

DESCRIPTION OF THE PREFERRED EMBODIMENT

Figure 1:
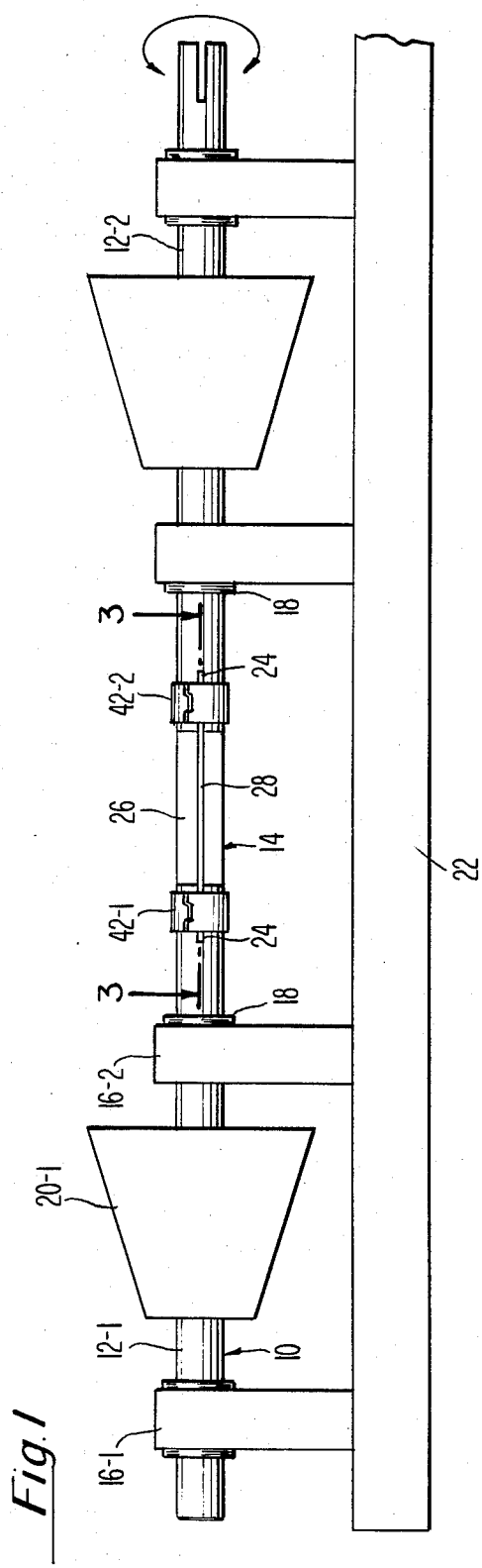
FIG. 1 is a plan view of a portion of an auger drive assembly formed by coupling together individual shaft sections by means of the coupling of the present invention.

FIG. 1 illustrates a typical application for the flexible coupling of the present invention. In this application, a continuous shaft 10 is provided by coupling together shaft sections 12 by means of coupling 14. The shaft 10 is supported by means of pillow blocks 16, a portion of the shaft 10 passing through and being freely rotatable within each pillow block 16. Retaining rings 18 are held on the shaft 10 via locking grooves (not shown) and prevent the longitudinal movement of the shaft 10. Means (not shown) are provided at one end of the shaft 10 to impart rotation to the shaft 10 in either direction shown. In the environment of a document sorting device; augers 20 are mounted on the shaft 10 to provide a means for driving stacker pocket documents axially (not shown). Assuming that it is necessary to replace an auger 20-1 or a shaft section 12-1, it is not necessary to remove the entire shaft 10 or detach all pillow blocks 16 from frame 22. Instead, all that is necessary is to remove coupling 14. Therafter, pillow blocks 16-1 and 16-2 may be detached from frame 22 to thereby accomplish the removal of shaft section 12-1 from the remainder of the shaft 10. After replacing the auger 20-1 or the shaft section 12-1, the shaft section 12-1 may be reinstalled by reconnecting pillow blocks 16-1 and 16-2 to the frame 22 and reinstalling coupling 14.

Depending on the application, a flexible coupling 14 may be provided to interconnect shaft sections 12 between each pair of pillow blocks 16 or instead the shaft sections 12 may each span a greater distance along the length of shaft 10. The shorter the lengths of the shaft sections 12, the smaller the portion of the shaft 10 that must be removed in order to replace a defective auger 20, shaft section 12, or other component.

Figure 3:
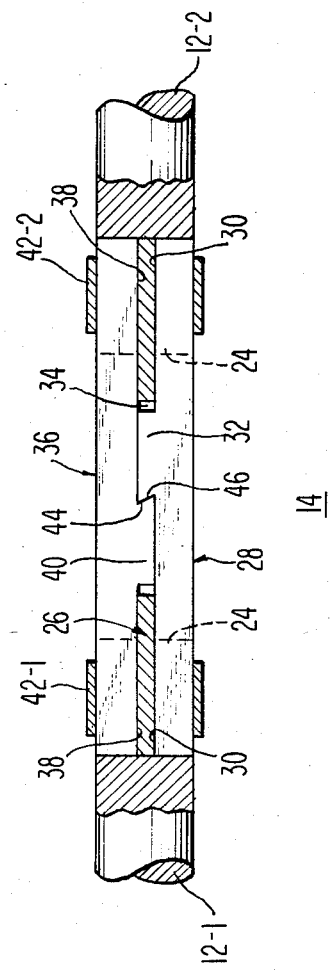
FIG. 3 is a sectional view of the assembled coupling taken along the lines 3—3 of FIG. 1.
Figure 2:
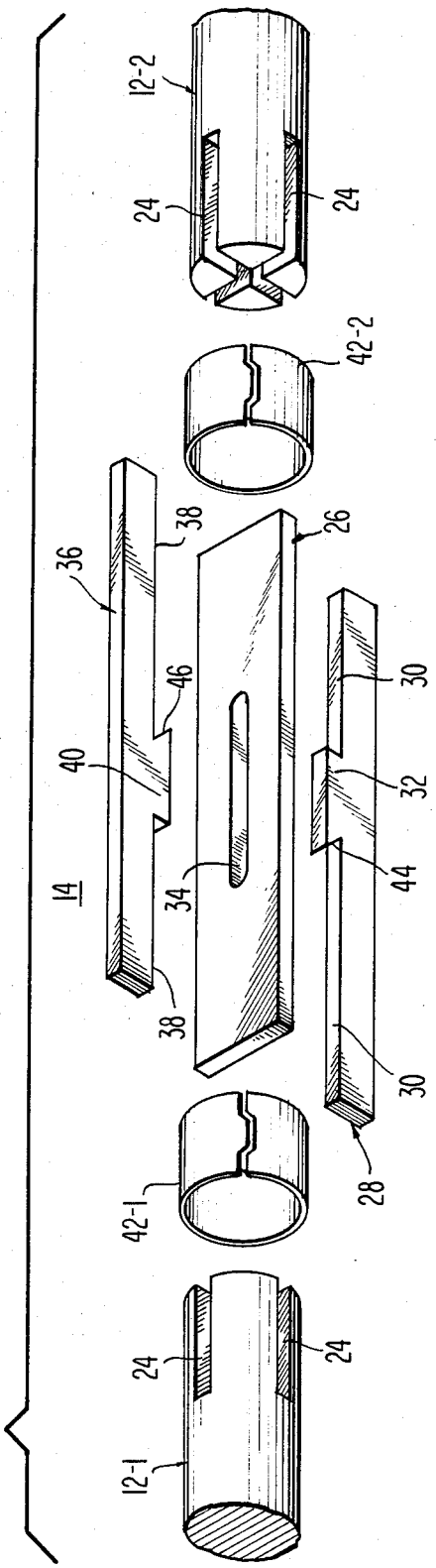
FIG. 2 is an exploded view of the coupling mechanism of the present invention.
Figure 4B:
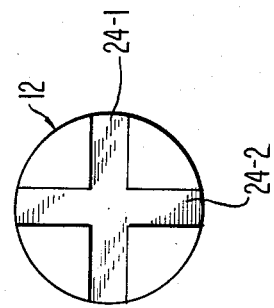
FIG. 4B is a plan view of the end of a solid shaft section showing the slots to receive the components of the present coupling.
Figure 4A:
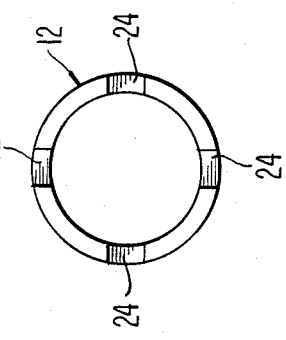
FIG. 4A is a plan view of the end of a tubular shaft section showing the slots to receive the components of the present coupling.

Referring now to FIGS. 2 and 4, the construction of the end of each joinable shaft section 12 may be seen in detail. In the preferred embodiment, the shaft sections are formed from a solid metallic rod. Two slots 24-1, 2, perpendicular to each other and spanning the diameter of the rod, are provided at each joinable end of a shaft section 12. As will be apparent from FIG. 3 and the description to follow, the longitudinal depth of the slots 24 is equal to or slightly greater than the length of the section of the joining elements 26, 28, 36 that will be inserted in the slots 24. As an alternative to a solid rod, the shaft sections 12 may be fabricated from a tubular material (see FIG. 4A).

In order to join together the ends of two shaft sections 12-1, 2, the shaft sections 12-1, 2 are first rotated so that the slots 24 at the adjacent ends of shaft sections 12-1, 2 are in longitudinal alignment. Next, either longitudinal edge of a bridging member 26 is inserted into either peripheral side of a first of the two aligned slots 24 in both shaft sections 12-1, 2, and pushed in the direction perpendicular to the longitudinal axis of shaft sections 12-1, 2 until the edges of bridging member 26 are in longitudinal alignment with the outer periphery of shaft sections 12-1, 2. Next, a first leaf member 28 is similarly inserted into either side of the second slot 24 in the ends of shaft sections 12-1, 2 and pushed in the direction perpendicular to the longitudinal axis of shaft sections 12-1, 2 until edge 30 contacts the opposed planar surface of bridging member 26. With the first leaf member 28 in position, protrusion 32 will pass through the adjacent portion of slot 34 in bridging member 26. Next, a second leaf member 36 is similarly inserted into the other peripheral side of the now partially occupied second slot 24 in the ends of shaft sections 12-1, 2 and similarly pushed until its surface 38 contacts the opposed planar surface of bridging member 26 with protrusion 40 passing through the adjacent portion of slot 34 in bridging member 26.

Those skilled in the art of the present invention will appreciate that the order that the leaf members 28,36 are inserted in is immaterial. Further, they will appreciate that in the preferred embodiment the opposed ends 44, 46 of protrusions 32,40 respectively are back angled in order to provide a mating interlock between the protrusions 44, 46.

With bridging member 26 and leaf members 28,36 now installed, spring clips 42-1, 2 (which previously were positioned on non-slotted portions of shaft sections 12-1, 2 respectively), are next untensioned by use of an appropriate tool and repositioned over the adjacent slotted ends of shaft sections 12-1, 2 respectively. After allowing the tension to be reapplied, the spring clips 42-1, 2 prevent the leaf members 28, 36 and bridging member 26 from falling out of their respective slots, thereby securing the joint between shaft sections 12-1 and 12-2.

FIG. 3 shows a sectional view taken along the lines A—A of FIG. 1, illustrating the bridging member 26 and leaf members 28 and 36 after they have been installed in the ends of shaft sections 12-1, 2. It should be noted that no longitudinal adjustment of the shaft sections 12-1, 2 is necessary in order to insert the bridging member 26 or leaf members 28 and 36.

Disassembly of the coupling 14 is the reverse of the assembly operation. That is, first the spring clips 42-1, 2 are released and slid away from the slotted ends of shaft sections 12-1, 2 respectively. Next, the leaf members 28 and 36 are removed from the second slot 24 they occupy in the adjacent ends of shaft sections 12-1, 2. Finally, the bridging member 26 is removed from engagement with the first slot 24 it occupies in the ends of shaft sections 12-1, 2.

In the preferred embodiment, the bridging member 26 and leaf members 28 and 36 are fabricated from either nylon or polypropylene. Alternately, these elements may be fabricated from polyurethane which is a much more flexible material than either nylon or polypropylene. By utilizing polyurethane to fabricate these elements, the coupling 14 can be made to be much more flexible, allowing for greater angular and lateral misalignment. Hence, by use of a flexible material to fabricate these members and a sufficient number of short shaft sections 12, a long flexible shaft can be obtained whereby a rotational force applied to one end of the shaft will be transferred to the undriven end of the shaft and points intermediate to the ends.

Having shown and described the preferred embodiment of the present invention, those skilled in the art will appreciate that various omissions, substitutions and changes in forms and detail may be made without departing from the spirit of the invention. It is the intention, therefore, for the scope of the invention to be limited only as indicated in the following claims.

What is claimed is:

1. An apparatus for coupling together two sections of shaft, two longitudinal slots passing through the periphery of one end of each of said two shaft sections, said apparatus comprising:
joining means, engageable with said two longitudinal slots in the end of each shaft section, for transmitting a force applied to one of said shaft sections to the other of said shaft sections; and
clip means, securable over the slotted end of each of said shaft sections, for maintaining said joining means in engagement with said two longitudinal slots in the end of each shaft section.

2. The apparatus in accordance with claim 1 wherein said joining means includes:
bridging means, engageable with a first one of said two longitudinal slots in each shaft section, for bridging together said two shaft sections;
first leaf means, engageable with a second one of said two longitudinal slots in each shaft section and with said bridging means, for further bridging together said two shaft sections; and
second leaf means, engageable with the second one of said two longitudinal slots in each shaft section and with said bridging means, for further bridging together said two shaft sections.

3. The apparatus in accordance with claim 2 wherein said clip means is positioned over part of the periphery of the said one end of each of said shaft sections for preventing said first and second leaf members from being disengaged from said second one of said two longitudinal slots in each shaft section.

4. The apparatus in accordance with claim 2 wherein the said one ends of said two shaft sections are longitudinally spaced apart from each other.

5. The apparatus in accordance with claim 2 wherein said bridging means includes a first elongated planar member having a longitudinal groove passing through its planar surface along a portion of the length of said planar member.

6. The apparatus in accordance with claim 5 wherein the thickness of said first elongated planar member is less than or equal to the width of said first longitudinal slot, the length of said first elongated planar member is less than or equal to the distance between the closed ends of said first longitudinal slots in said two shaft sections, and the width of said first elongated planar member is less than or equal to the diameter of said shaft sections.

7. The apparatus in accordance with claim 5 wherein said first and second leaf means each include a second elongated planar member having a protrusion extending from one edge, each of said protrusions engaged with the groove in said bridging means when said leaf means are engaged with said second one of two longitudinal slots in each shaft section.

8. The apparatus in accordance with claim 7 wherein the width of each of said second elongated planar members is less than the radius of said shaft sections and the width of each of said protrusions is approximately equal to the thickness of said bridging means.

9. The apparatus in accordance with claim 7 wherein one end of each of said protrusions is at an acute angle with respect to the connected edge of said second elongated planar member and the said one end of each of said protrusions are parallel and adjacent to each other when said first and second leaf means are engaged with said bridging means.

10. The apparatus in accordance with claim 3 wherein said clip means includes two spring type clips, one of which is secured around the periphery of each shaft section over the longitudinal slots in the end of each shaft section.

11. The apparatus in accordance with claim 3 wherein each of said shaft sections is formed from a solid right circular cylinder.

12. The apparatus in accordance with claim 3 wherein each of said shaft sections is formed from a tubular right circular cylinder.

13. The apparatus in accordance with claim 2 wherein said first and second slots cut across the diameter of the shaft section and are perpendicular to each other.

14. The apparatus in accordance with claim 2 wherein said bridging means and said first and second leaf means are fabricated from polyurethane.

15. The apparatus in accordance with claim 1 wherein said two shaft sections are coupled together to form a drive shaft wherein a rotational force applied to one shaft section produces a corresponding rotation in the second shaft section.

16. The apparatus in accordance with claim 15 wherein each shaft section is held in longitudinal alignment by means of a plurality of pillow blocks, each shaft section passing through one of said plurality of pillow blocks, and wherein each shaft section is restrained from lateral movement by means of a retaining ring mounted on each shaft section adjacent to said one pillow block.

17. The apparatus in accordance with claim 1 wherein said clip means includes means, when engaged with said two longitudinal slots in the end of each of said two shaft sections, for covering the circumferential periphery of said two shaft sections along said two longitudinal slots in the end of said two shaft sections.

18. An apparatus for coupling together a plurality of at least three shaft sections to form a continuous semiflexible shaft, two longitudinal slots passing through one end of two of said plurality of shaft sections to be positioned at the ends of said continuous semiflexible shaft, two longitudinal slots passing through each end of at least one intermediate shaft section included in said plurality of shaft sections, each one of said plurality of shaft sections coupled to an adjacent one of said plurality of said shaft sections by a joining means, engageable with the two longitudinal slots in the adjacent ends of said adjacent shaft sections, said joining means for transmitting a force applied to one of said adjacent shaft sections to the other of said adjacent shaft sections, each of said joining means maintained in engagement with the two longitudinal slots in the adjacent ends of said adjacent shaft sections by a clip means securable over the adjacent end of each of said adjacent shaft sections.

19. The apparatus in accordance with claim 18 wherein said joining means includes:

bridging means, engageable with a first one of said two longitudinal slots in the adjacent ends of each of two adjacent shaft sections, for bridging together said two adjacent shaft sections;

first leaf means, engageable with a second one of said two longitudinal slots in the adjacent ends said of two adjacent shaft sections and with said bridging means, for further bridging together said two adjacent shaft sections; and second leaf means, engageable with said second one of said two longitudinal slots in the adjacent ends of said two adjacent shaft sections and with said bridging means, for further bridging together said two adjacent shaft sections.

20. The apparatus in accordance with claim 19 wherein said bridging means and said first and second leaf means are fabricated from a flexible material.

21. The apparatus in accordance with claim 20 wherein each of said plurality of shaft sections are of much shorter length than the length of the continuous semiflexible shaft formed.

22. The apparatus in accordance with claim 1 wherein said joining means includes a first elongated planar member, said first planar member engageable with a first one of said two longitudinal slots in each of said two shaft sections.

23. The apparatus in accordance with claim 1 wherein said joining means, when engaged with said two longitudinal slots in the end of each of said two shaft sections, does not extend beyond the circumferential face of either of said two shaft sections.

* * * * *